(12) United States Patent
Stenberg

(10) Patent No.: US 7,549,395 B2
(45) Date of Patent: Jun. 23, 2009

(54) PORTABLE DRINK CONTAINER FOR PETS

(76) Inventor: Mark Stenberg, 1712 W. Beach, Unit 1, Chicago, IL (US) 60622

( * ) Notice: Subject to any disclaimer, the term of this patent is extended or adjusted under 35 U.S.C. 154(b) by 189 days.

(21) Appl. No.: 11/510,204

(22) Filed: Nov. 20, 2006

(65) Prior Publication Data

US 2008/0115732 A1 May 22, 2008

(51) Int. Cl.
*A01K 7/00* (2006.01)
*B67D 5/06* (2006.01)

(52) U.S. Cl. .................................. 119/74; 222/205

(58) Field of Classification Search ............. 119/72, 119/74, 75, 81, 51.5, 61.54, 77, 61.5; 220/23.83, 220/501, 521, 503, 505, 506, 707, 711, 713; 222/205, 207, 211, 81, 88; 206/216, 217; 239/16, 17, 24, 28, 29, 29.3, 327; 215/388, 215/389
See application file for complete search history.

(56) References Cited

U.S. PATENT DOCUMENTS

| | | | | | |
|---|---|---|---|---|---|
| 1,259,253 | A | * | 3/1918 | McCullough | 119/74 |
| 3,241,724 | A | * | 3/1966 | Lerner | 222/146.3 |
| 3,246,807 | A | * | 4/1966 | Micallef | 222/207 |
| 4,106,673 | A | * | 8/1978 | Donoghue | 222/207 |
| 4,474,312 | A | * | 10/1984 | Donoghue | 222/205 |
| 4,971,226 | A | * | 11/1990 | Donoghue | 222/207 |
| 5,070,817 | A | * | 12/1991 | Momont | 119/75 |
| 5,381,930 | A | * | 1/1995 | Kalabakas | 222/205 |
| 5,809,935 | A | * | 9/1998 | Kolterman et al. | 119/74 |
| 2005/0121477 | A1 | * | 6/2005 | Scott | 222/522 |
| 2006/0151421 | A1 | * | 7/2006 | Rho | 215/297 |

* cited by examiner

*Primary Examiner*—Michael R Mansen
*Assistant Examiner*—Stephen Brookman
(74) *Attorney, Agent, or Firm*—McDermott, Will & Emery LLP

(57) ABSTRACT

A portable drink container includes a fluid vessel having an upwardly extending neck with an outlet opening. A removable cap has a central aperture and a cavity that engages the vessel neck. A drinking bowl includes a bottom wall with a central opening defined by an internal edge of the bottom wall. A lower peripheral channel of the cap slidingly receives the bottom wall edge to connect the cap and the drink bowl, whereby the cap extends through the central opening of the bowl. A flexible conduit is positioned within the vessel and extends the cap and the central opening of the drink bowl. The conduit defines a passageway for fluid to travel from the vessel into the drink bowl. An elastomeric plug may be secured within the cap to stabilize the conduit. The pet owner applies a compressive force on the vessel to increase the hydrostatic pressure thereby forcing liquid through the conduit and into the drink bowl.

12 Claims, 12 Drawing Sheets

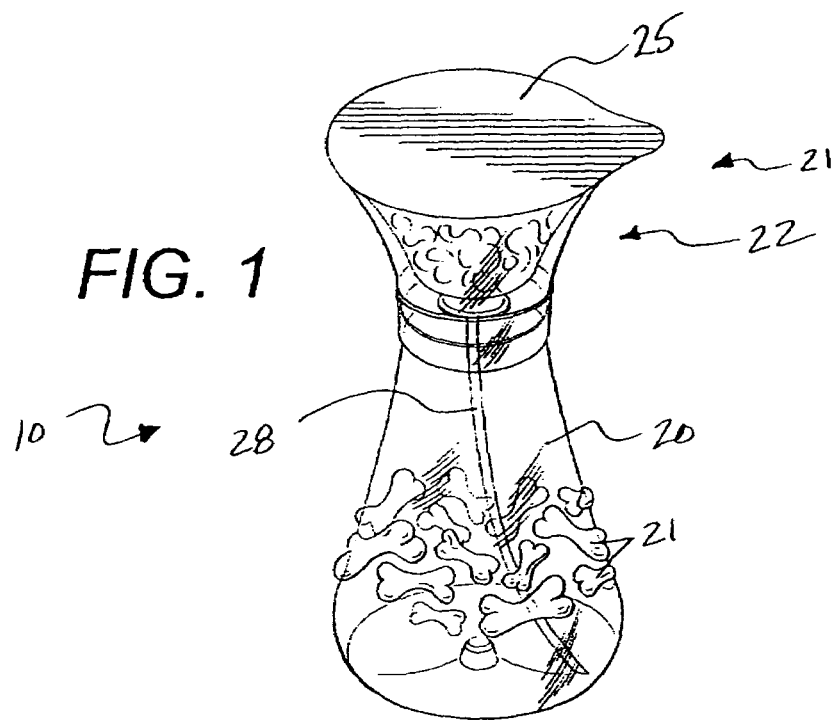
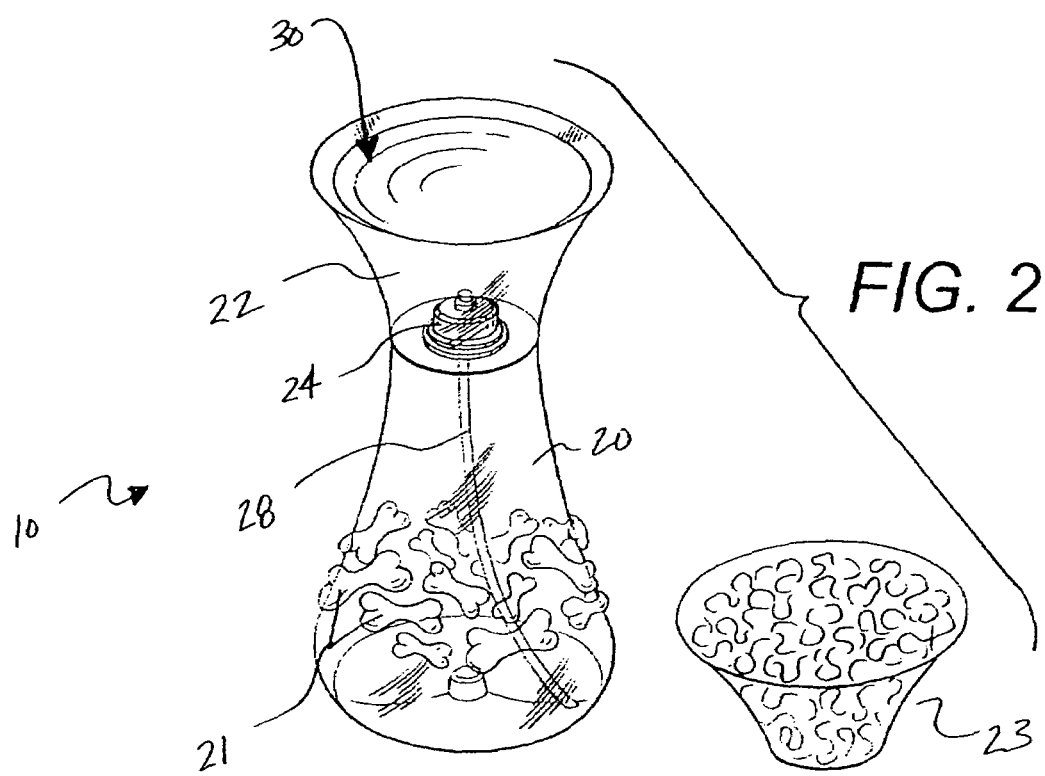

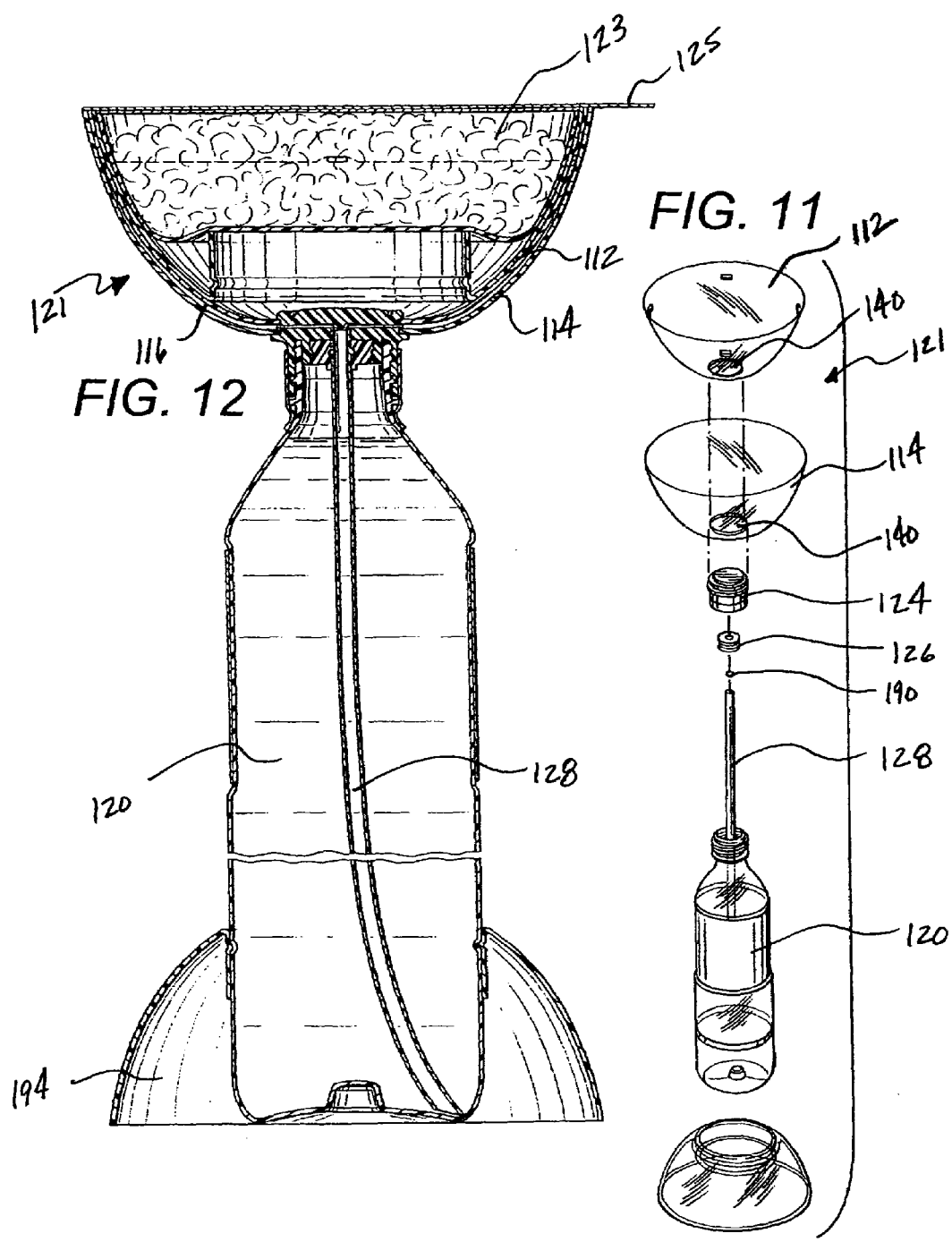

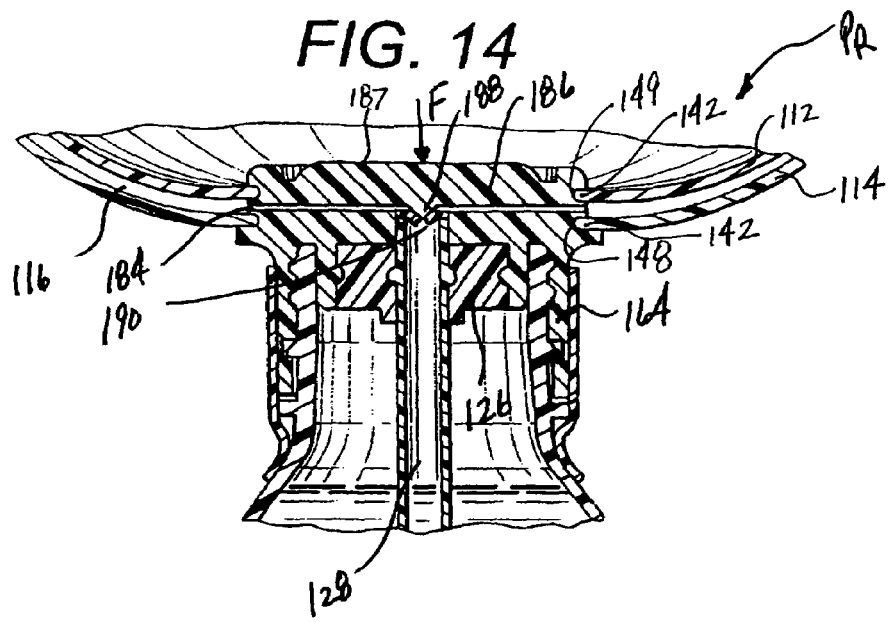
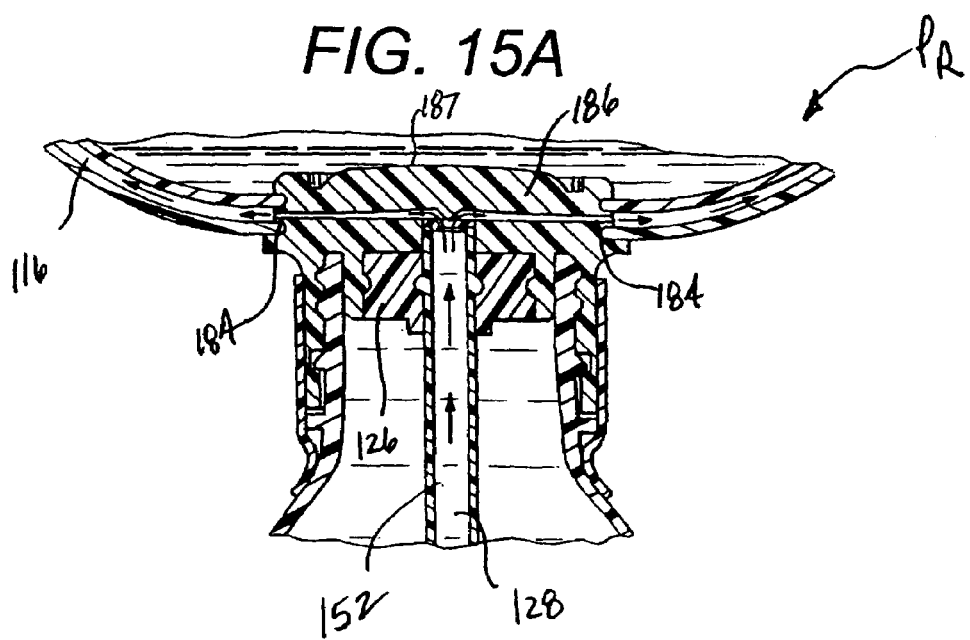

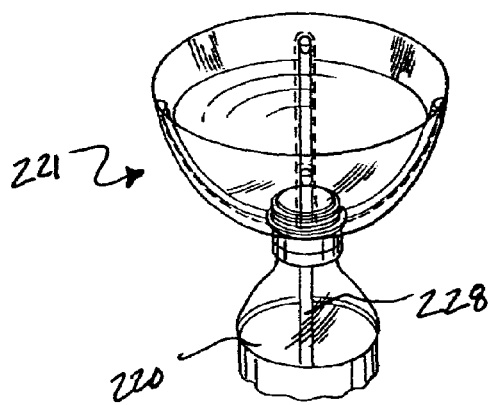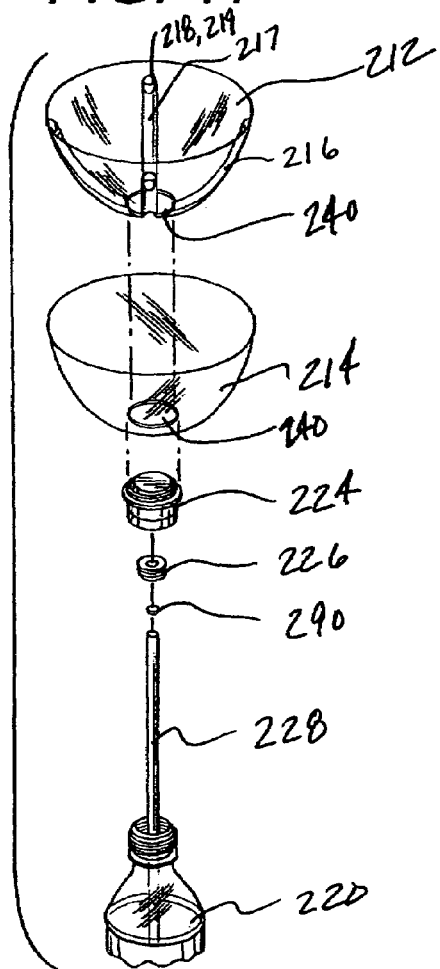

PORTABLE DRINK CONTAINER FOR PETS

CROSS-REFERENCE TO RELATED APPLICATIONS

Not applicable.

FEDERALLY SPONSORED RESEARCH OR DEVELOPMENT

Not applicable.

TECHNICAL FIELD

The invention relates to a drink container for pets wherein the container has a bowl removably connected to the vessel containing the liquid. The container also includes a flexible conduit to transfer the liquid to the bowl when hydrostatic pressure is applied to the vessel.

BACKGROUND OF THE INVENTION

Portable drink containers for pets are generally known in the art. While existing drink containers provide some beneficial features, they nevertheless have certain limitations. The present invention seeks to overcome certain of these limitations and other drawbacks of the existing containers, and to provide new features not heretofore available. As an example, the present drink container provides a way of reducing messy spills by keeping the liquid contained until the pet is ready to drink from the attached bowl. No pouring is required with this portable drink container, and a separate drinking bowl is unnecessary. When ready for use, the pet owner simply applies pressure to the drink container in order to transfer the liquid from the holding vessel through the conduit and into the bowl.

A full discussion of the features and advantages of the present invention is deferred to the following detailed description, which proceeds with reference to the accompanying drawings.

SUMMARY OF THE INVENTION

The present invention is directed to a portable drink container for pets. The drink container generally includes with a vessel that contains the liquid or fluid to be consumed by the pet, a drinking bowl, a cap, an elastomeric plug and a flexible conduit. Unlike conventional pet drink containers, the container of the present invention is configured to interchangeably receive fluid vessels such that the drink bowl, cap, elastomeric plug and flexible conduit can be reused, thereby increasing the versatility of the container.

According to an aspect of the invention, the fluid vessel includes an upwardly extending neck with an outlet opening. The drink bowl includes a bottom wall with a central opening defined by an internal edge of the bottom wall. The bottom wall is resiliently deformable or flexible to allow for engagement with the cap in order to join bowl with the vessel. The cap has a central aperture and a cavity that engages the upwardly extending neck of the vessel. The cavity is defined by an inner wall and an outer wall, wherein each wall depends from an upper cap wall. A lower portion of the outer cap wall includes a flange with a circumferential channel that receives the bottom wall edge to connect the bowl to the cap. When the bowl and cap are in an assembled position, the cap is secured to the vessel and the bowl is secured to the cap. In the assembled position, the cap extends through the opening and into the interior region of the bowl. The bottom wall of the drink bowl flexes or resiliently deforms as it is slidingly received by the channel to arrive at the assembled position. The engagement of the bottom wall edge of the drink bowl and the channel forms a substantially leak-proof fit, ensuring that once fluid enters the drink bowl, the fluid will not leak out via the central opening of the bottom wall.

According to another aspect of the invention, the plug is removably connected to the cap below the top cap wall. The plug includes an orifice that is aligned with the aperture of the cap, wherein the conduit extends through the orifice and the aperture and into the interior region of the bowl. The flexible conduit is a tubular structure extending upward from the fluid vessel, wherein a discharge opening is positioned within the bowl. Thus, the conduit extends through the outlet opening of the neck, the orifice of the elastomeric plug, the aperture of the cap, and the central opening of the drink bowl. As such, a passageway is defined from the fluid vessel through the conduit and to the drink bowl for fluid flow when a pet owner or user applies a compressive force on the vessel that increases the hydrostatic pressure within the vessel. An upper flap segment of the flexible conduit has a reclosable discharge opening formed from a living hinge. In an open position, the flap segment is pivoted about the hinge and the discharge opening is open to allow for the outflow of fluid from the conduit. In a closed position, the flap segment is down and the discharge opening is closed. The application of a compressive force upon the vessel results in hydrostatic pressure, which in turn causes the fluid to flow up the conduit and move the flap segment between the closed and open positions.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a portable pet drink container of the present invention, showing a seal of the container intact;

FIG. 2 is a perspective view of the drink container, showing an internal bowl removed from an outer bowl;

FIG. 11 is an exploded view of the drink container of FIG. 9, showing an inner bowl, an outer bowl, a cap, a plug, and a conduit exploded from a vessel and a base;

FIG. 12 is a cross-sectional view of the drink container of FIG. 9;

FIG. 14 is a partial cross-sectional view of the drink container of FIG. 9, showing a piercing element of the cap rupturing a seal of the conduit;

FIG. 15A is a partial cross-sectional view of the drink container of FIG. 9, showing the conduit in an open position to allow for flow of the liquid from the vessel through the cap;

FIG. 16 is a partial perspective view of a third embodiment of the drink container of the present invention;

FIG. 17 is an exploded view of the drink container of FIG. 16, showing an inner bowl, an outer bowl, a cap, a plug, and a conduit exploded from a vessel;

DETAILED DESCRIPTION

Figure 3:
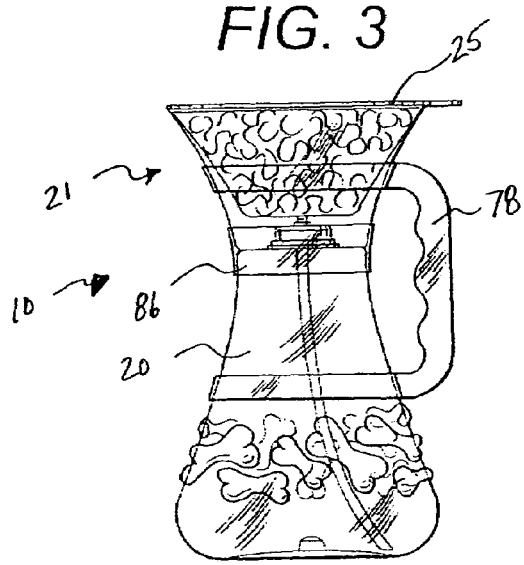
FIG. 3 is a side view of the drink container, showing the container having a handle.
Figure 4:
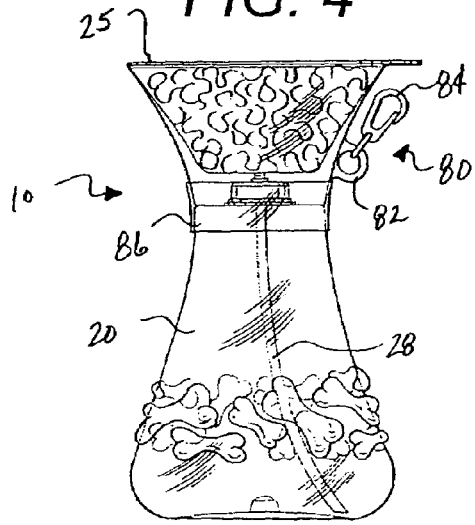
FIG. 4 is a side view of the drink container, showing the container having an attaching clip.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-8 depict a first embodiment of a portable drink container 10 for pets that the pet owner can carry while walking the pet or engaging in activities that result in the pet becoming thirsty. The drink container 10 includes with a vessel 20 that contains the liquid or fluid to be consumed by the pet, a drinking bowl 22, a cap 24, an elastomeric plug 26 and a flexible conduit 28. Since the drink bowl 22 has a wide opening or mouth 30, the drink container 10 can be transported by the pet owner between various locations to allow the pet to drink from the container 10 once the container is placed on a support surface, such as the ground. Unlike conventional pet drink containers, the container 10 of the present invention is configured to interchangeably receive fluid vessels 20 such that the drink bowl 22, cap 24, elastomeric plug 26 and flexible conduit 28 can be reused, thereby increasing the versatility of the container 10. In this manner, the drink bowl 22, cap 24, elastomeric plug 26 and flexible conduit 28 form a drink platform 32 that can be connected to different vessels 20 for repeated use. The liquid stored in the vessel 20 may be water or vitamin enriched water to aid with the health of the pet.

Figure 5:
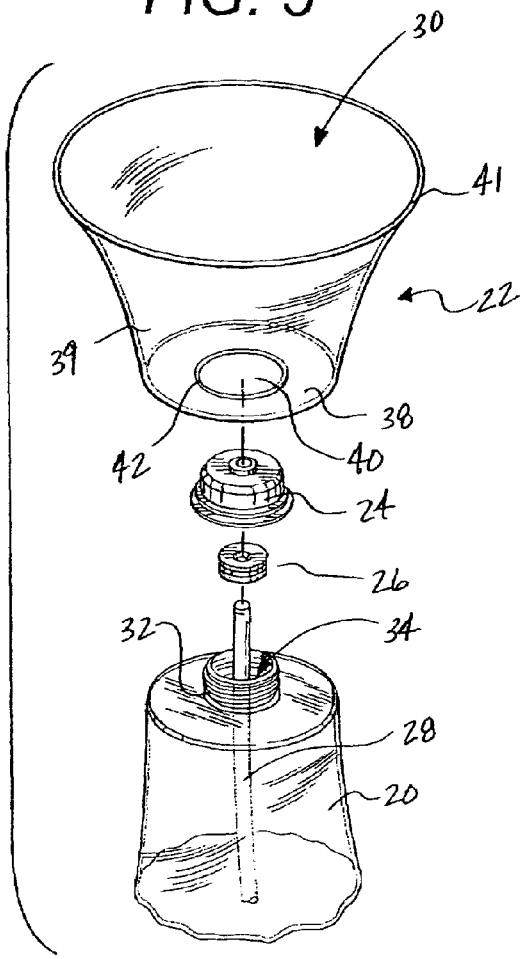
FIG. 5 is a partial exploded view of the drink container, showing an outer bowl, a cap and a plug exploded from a vessel and a conduit of the drink container.
Figure 6:
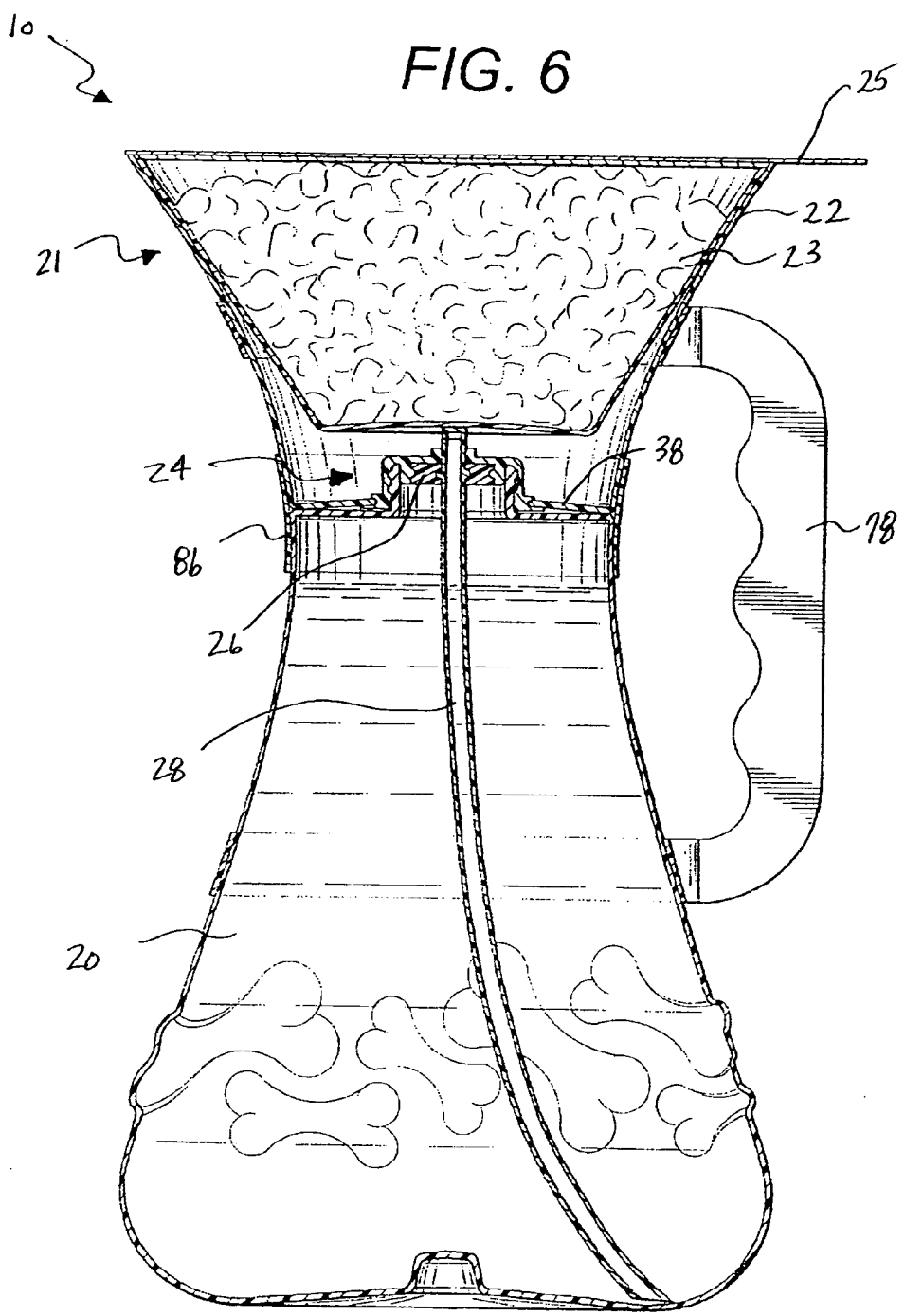
FIG. 6 is a cross-sectional view of the drink container of FIG. 3.

Referring to FIG. 5, the fluid vessel 20 includes an upwardly extending neck 32 with an outlet opening 34 and external threads 36. Preferably, the neck 32 extends substantially perpendicular to a top wall 20a of the vessel 20. As explained below, the neck 32 connects the vessel 20 to the drink bowl 22, allowing for the passage of fluid from the vessel 20 to the bowl 22. The vessel 20 is preferably fabricated from plastic and may be adorned with decorative designs 23. The designs 23 may be integrally formed in the vessel 20, for example through a blowing or molding process, or subsequently attached to the vessel 20 after its formation. In one preferred embodiment, the vessel 20 has a bulbous lower portion that is adapted to stabilize the vessel 20 when placed on a horizontal support surface.

The outer drink bowl 22 is part of a bowl assembly 21 that includes a removable inner bowl 23. The inner bowl 23 is adapted to contain consumable treats for the pet and nests within the larger, outer bowl 22. A seal 25, for example a tamper resistant seal, is placed over the bowl assembly 21 and is removable by the consumer. As shown in FIGS. 5-8, the drink bowl 22 comprises a bottom wall 38 with a central opening 40 defined by an internal edge 42 of the bottom wall 38. A sidewall arrangement 39 extends upward from the bottom wall 38 to an upper edge 41 that defines the mouth 30. Preferably, the sidewall 39 has a downward taper such that the diameter at the mouth 30 is greater than the diameter at the bottom wall 38. As explained below, the bottom wall 38 is resiliently deformable or flexible to allow for engagement with the cap 24 in order to join bowl 22 with the vessel 20.

Figure 7:
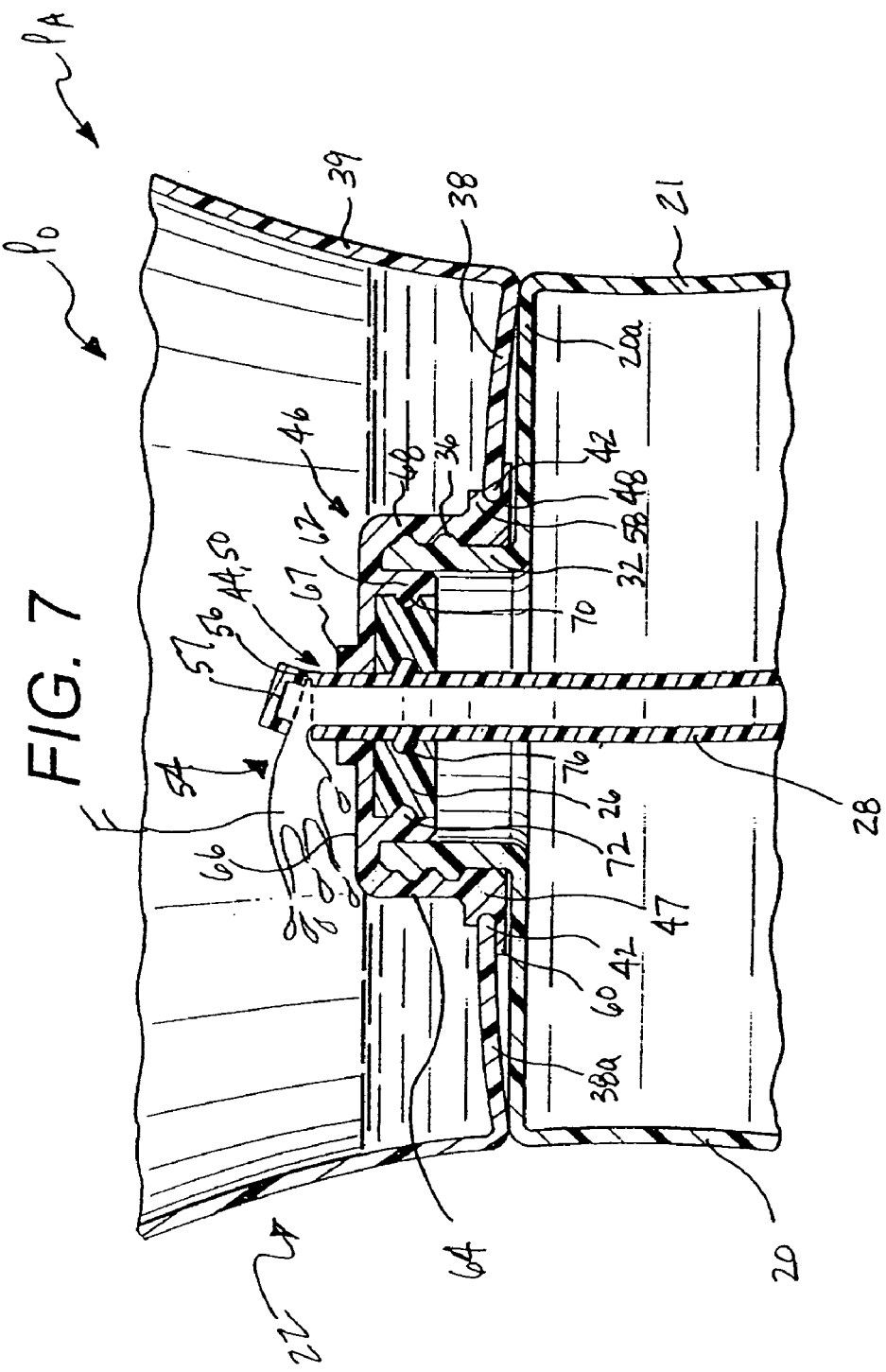
FIG. 7 is a partial cross-sectional view of the drink container, showing a hinged portion of the conduit in an open position.
Figure 8:
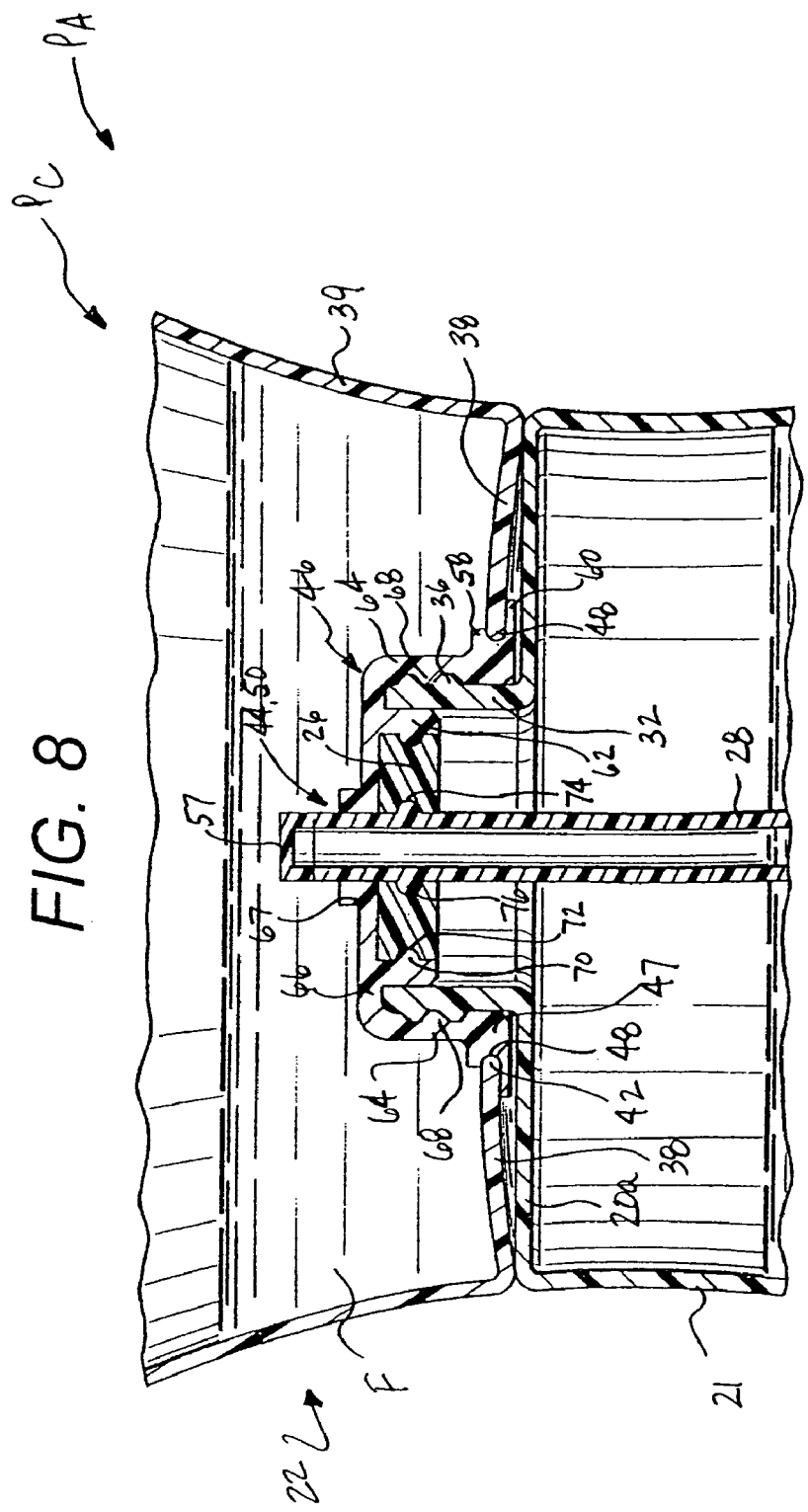
FIG. 8 is a partial cross-sectional view of the drink container, showing the hinged portion of the conduit in a closed-position.
Figure 9:
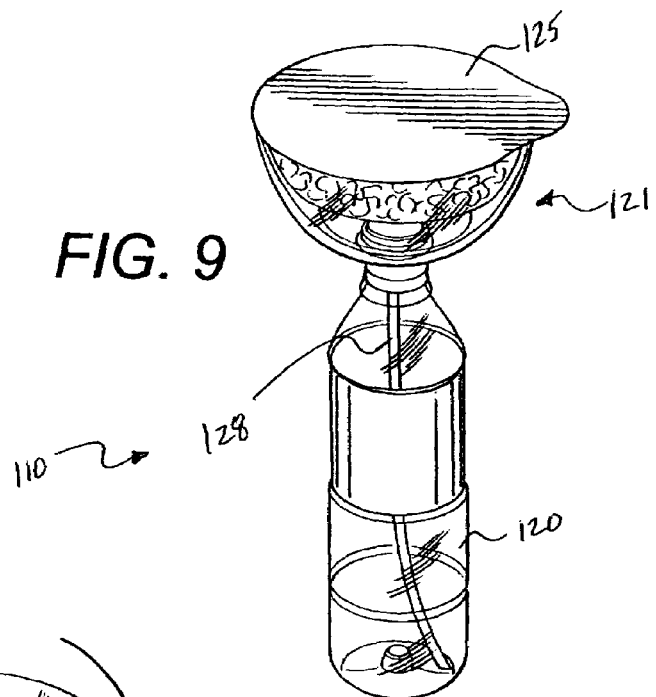
FIG. 9 is a perspective view of a second embodiment of the drink container of the present invention.
Figure 10:
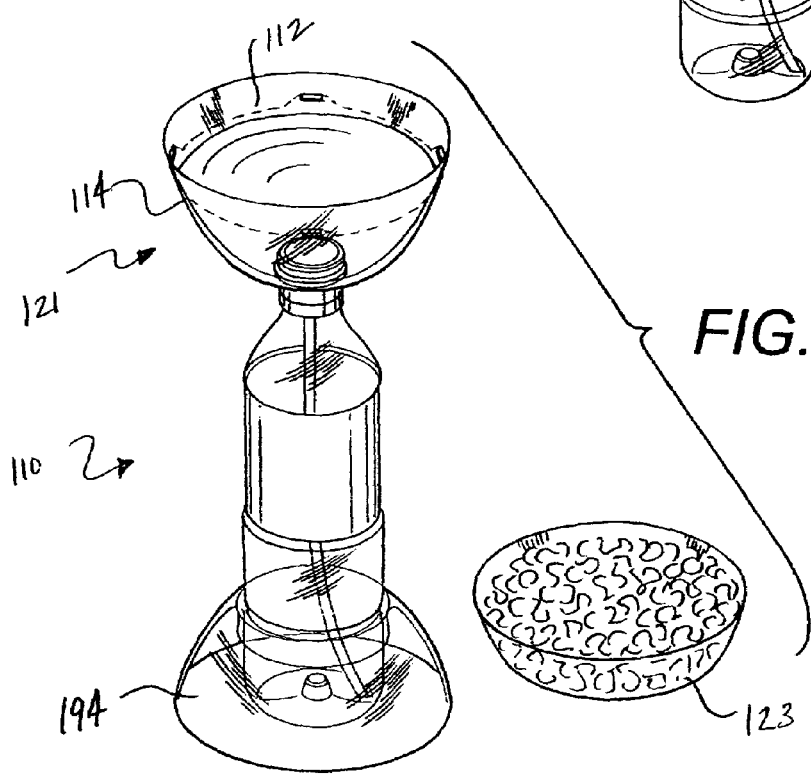
FIG. 10 is a perspective view of the drink container of FIG. 9, showing a removable base connected to the vessel.

The cap 24 has a central aperture 44 and a cavity 46 that engages the upwardly extending neck 32 of the vessel 20 (see FIGS. 7 and 8). The cavity 46 is defined by an inner wall 62 and an outer wall 64, wherein each wall 62, 64 depends from an upper cap wall 66. Preferably, the neck 32 has external threads 36 and the outer wall 64 has internal threads 68 that intermesh with the external threads 36 to secure the cap 24 to the neck 32. The upper wall 66 may include a central ring 67 that stabilizes the conduit 28 extending through the opening 44. A lower portion of the outer wall 64 includes a flange 47 with a circumferential channel 48 that receives the bottom wall edge 42 to connect the bowl 22 to the cap 24. As shown in FIGS. 7 and 8, when the bowl 22 and cap 24 are in an assembled position $P_A$, the cap 24 is secured to the vessel 20 and the bowl 22 is secured to the cap 24. In the assembled position $P_A$, the cap 24 extends through the opening 40 and into the interior region of the bowl 22. Furthermore, the flange 47 is positioned above the top wall 20a of the vessel 20, and the bottom wall 38 has a curvilinear deformation 38a to facilitate reception of the edge 42 in the channel 48. The bottom wall 38 of the drink bowl 22 flexes or resiliently deforms as it is slidingly received by the channel 48 to arrive at the assembled position Pa. The channel 48 includes an upper end wall 58 and a lower end wall 60, which may extend radially outward and past the upper end wall 58. Thus, during downward movement of the bowl 22, the upper end wall 58 engages the internal edge 42 of the bottom wall 38 of the drink bowl 22. In the assembled position Pa, the internal edge 42 is positioned between the upper end wall 58 and lower end wall 60 of the channel 48. The engagement of the bottom wall edge 42 of the drink bowl 22 and the channel 48 forms a substantially leak-proof fit, ensuring that once fluid enters the drink bowl 22, the fluid will not be able to escape via the central opening 40 of the bottom wall 38. In one embodiment, one of either the bottom wall edge 42 or the channel 48 may include an elastomeric member, such as a rubber ring, to enhance the seal between the bottom wall edge 42 and the channel 48.

The plug 26, which may be elastomeric, is removably connected to the cap 24 below the top cap wall 66. The plug 26 includes an orifice 50 that is aligned with the aperture 44 of the cap 24, wherein the conduit 28 extends through the orifice 50 and the aperture 44 and into the interior region of the bowl 22. The plug 26 has an indent 72, preferably circumferential, that engages a protrusion 70 of the inner cap wall 62. The engagement between the protrusion 70 and the indent 72 secures the plug 26 to the cap 24. In addition, an inner wall of the orifice 50 includes a groove 74 that receives a protrusion 76 of the conduit 28 for stabilization of the conduit 28. These structural interactions help to ensure the stable positioning of the bowl 22, the cap 24, the plug 26 and the conduit 28.

As mentioned above, the flexible conduit 28 is a tubular structure extending upward from the fluid vessel 20, wherein a discharge opening 54 (see FIG. 7) is positioned within the bowl 22. Specifically, the conduit 28 extends through the outlet opening 34 of the neck 32, the orifice 50 of the elastomeric plug 26, the aperture 44 of the cap 24, and the central opening 40 of the drink bowl 22. As such, the conduit 28 is part of a passageway 52 defined from the fluid vessel 20 through the plug 26 and to the drink bowl 22 for fluid flow when a pet owner or user applies a compressive force on the vessel 20 that increases the hydrostatic pressure within the vessel 20. An upper portion of the flexible conduit 28 has a reclosable discharge opening 54 formed from a living hinge 56. A closed end wall or flap segment 57 is positioned above the hinge 56. Alternatively, the end wall of the flexible conduit 28 is open, which precludes the reclosable discharge opening 54. In an open position Po (see FIG. 7), the flap segment 57 is pivoted about the hinge 56 and the discharge opening 54 is open to allow for the outflow of fluid F from the conduit 28. To reach the open position Po, the user compresses the vessel 20 and fluid travels upward through the conduit passageway 52, the pressure of the fluid F causes the flap segment 57 to pivot upward about the hinge 56 and expose the opening 54, thereby allowing the fluid F to exit the conduit 28 and enter the drink bowl 22. In a closed position Pc (see FIG. 8), the flap segment 57 is down and the discharge opening 54 is closed. When the user stops compressing the vessel 20, the flap segment 57 pivots downward about the hinge 56 to close the opening 54 and prevent reverse fluid flow from the bowl 22 into the conduit 28. Thus, the application of a compressive force upon the vessel 20 results in hydrostatic pressure, which in turn causes the fluid F to move the conduit 28 between the closed and open positions Pc, Po.

As mentioned above, the drink container 10 may further include a removable seal 25 which extends across an upper edge of the bowl 22. The removable seal 25 will ensure the drink bowl 22 is not contaminated or spilled when not in use. To facilitate carrying and/or transport, the drink container 10 may include a handle 78 (see FIGS. 3 and 6) or a clip assembly 80 (see FIG. 4), which includes a ring 82 and a clip member 84. The container 10 may also include a safety seal 86 (see FIGS. 3, 4 and 6) overlying an upper portion of the vessel 20 and a lower portion of the bowl 22.

In another embodiment of the invention, a second drink container 110 is depicted in FIGS. 9-15. Structures of the drink container 110 that correspond to structures in the first drink container 10 have one-hundred series reference numerals. For example, the drink container 110 comprises a fluid vessel 120, a drink bowl assembly 121, a cap 124, and a flexible conduit 128. Distinct structures of the drink container 110 are explained as follows.

Figure 13:
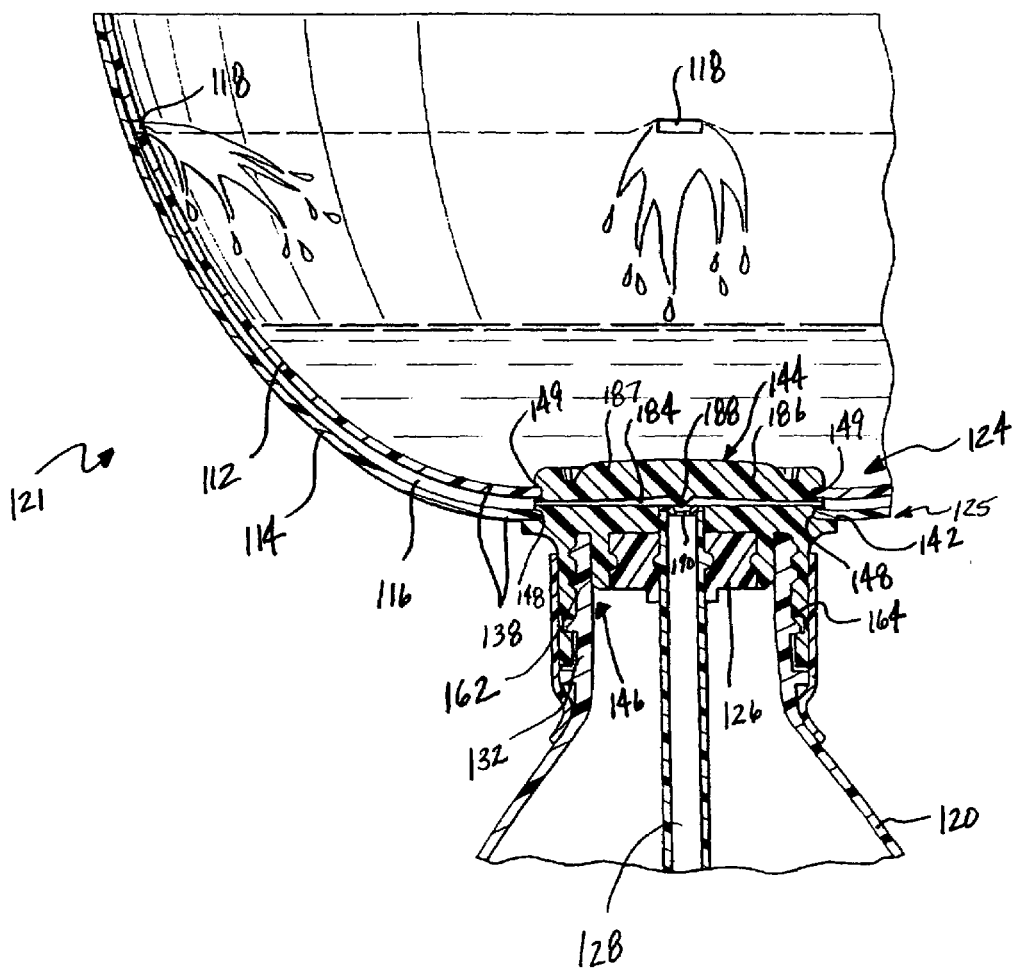
FIG. 13 is a partial cross-sectional view of the drink container of FIG. 9, showing a cap passageway and a bowl passageway that allow for liquid to move from the vessel through the cap and into the inner bowl.

The drink bowl assembly 121 is formed from an inner bowl 112 joined to an outer bowl 114. As shown in FIG. 13, the inner and outer bowls 112, 114 are sealed at their upper portions, for example by molding or heat sealing, and are spaced a distance apart at their intermediate and lower portions to define a bowl passageway 116 there between. Preferably, the space between the two bowls 112, 114 increases from the upper to lower portions of the bowls 112, 114. Each of the inner and outer bowls 112, 114 has a bottom wall 138 with a central opening 140 defined by an internal edge 142. At an upper portion, the inner bowl 112 has at least one outlet 118 that is fluid communication with the bowl passageway 116 such that fluid can exit the passageway 116 via the outlet 118. Thus, fluid travels through the bowl passageway 116 and the outlet 118 to accumulate within the inner drink bowl 112. Preferably, the bowls 112, 114 are sealed about their circumference just above the outlets 118.

The cap 124 has a main or lower body portion 125 with a central aperture 144, a cavity 146 that receives the neck 132 of the vessel 120, and a lower channel 148 that slidingly receives the internal edge 142 of the bottom wall 138 to connect the cap 124 with the outer bowl 114. The plug 126 is retained radially inward of the inner wall 162 that forms the cavity 146. Furthermore, the cap 124 includes an upper portion 186 with a piercing element 188, that preferably depends downward towards the conduit 128. The cap 124 has at least one cap passageway 184 positioned beneath the upper portion 186, wherein the passageway 184 is a tubular structure that extends radially outward from the central aperture 144 towards the periphery of the cap 124. The outlet of each cap passageway 184 is aligned with an inlet portion of the bowl passageway 116. An upper portion 186 of the cap 124 has an upper channel 149 that slidingly receives the internal edge 142 of the bottom wall 138 to connect the cap 124 with the inner bowl 112. To form the cap 124, the lower portion 125 and the upper portion 186 may be fabricated separately, for example by plastic injection molding, and then joined together, for example by use of a heat bonding and/or a sealant. The separate formation of the lower and upper portions 125, 186 allows the cap passageway 184 to be formed in two segments—an upper, hemispherical segment as part of the upper portion 186 and a lower, hemispherical segment as part of the lower portion 125. Accordingly, the upper and lower segments combine to form the cap passageway 184 when the lower and upper portions 125, 186 are joined to form the cap 124.

Figure 15B:
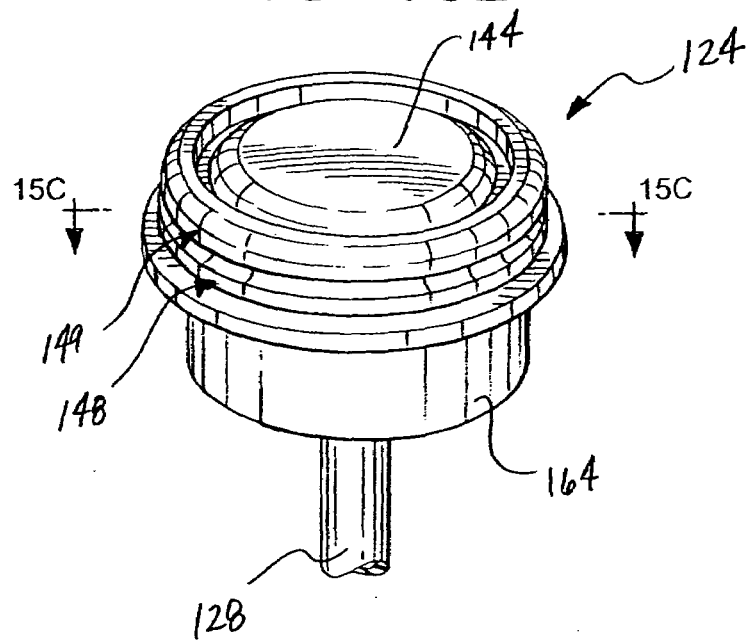
FIG. 15B is a perspective view of the cap of the drink container of FIG. 9, showing a plurality of internal cap passageways.
Figure 15C:
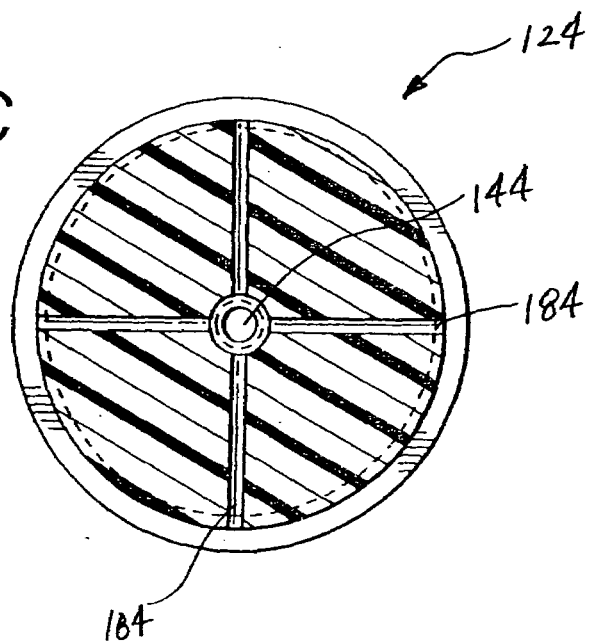
FIG. 15C is a cross-sectional view of the cap of FIG. 15B, showing the internal cap passageways.

The flexible conduit 128 of the drink container 110 is positioned within the fluid vessel 120, and it extends through the aperture 144 of the cap 124. At its upper edge, the conduit 128 has a frangible seal 190 that is ruptured by the piercing element 188 when a downwardly directed force F is applied to an upper wall 187 of the upper cap portion 186 (see FIG. 14). Thus, in a ruptured position $P_R$ (see FIGS. 14 and 15), the ruptured seal 190 exposes the conduit 128 to define a conduit passageway 152 for fluid flow. Once the seal 190 is ruptured, the conduit passageway 152, the cap passageway 184 and the bowl passageway 116 collectively define an overall fluid passageway from the vessel 120 through both the cap 124 and the bowl assembly 121 and into the interior of the inner bowl 112. Referring to FIG. 15A and assuming the user applies a sufficient amount of compression upon the vessel 120 to increase the hydrostatic pressure, fluid (as represented by the arrows) travels through the conduit passageway 152, the cap passageway 184 and the bowl passageway 116 and exits the outlets 118 for accumulation within the inner bowl 112. In a preferred embodiment shown in FIGS. 15B and C, the cap 124 has four distinct cap passageways 184 that extend radially outward from the central aperture 144. The cap passageways 184 are arrayed approximately 90 degrees apart.

In this embodiment, the drink container 110 may include a removable support base 194 with an internal receiver that receives a lower portion of the fluid vessel 120. Preferably, the base 194 has a smaller circumference than the inner bowl 112, such that the base 194 can be positioned or nested within the inner bowl 112 (see FIG. 12).

In another embodiment of the invention, a third drink container 210 is depicted in FIGS. 16-21. Structures of the drink container 210 that correspond to structures in the first drink container 10 have two-hundred series reference numerals. For example, the drink container 210 comprises a fluid vessel 220, a drink bowl assembly 221, a cap 224, and a flexible conduit 228. Distinct structures of the drink container 210 are explained as follows.

Figure 18:
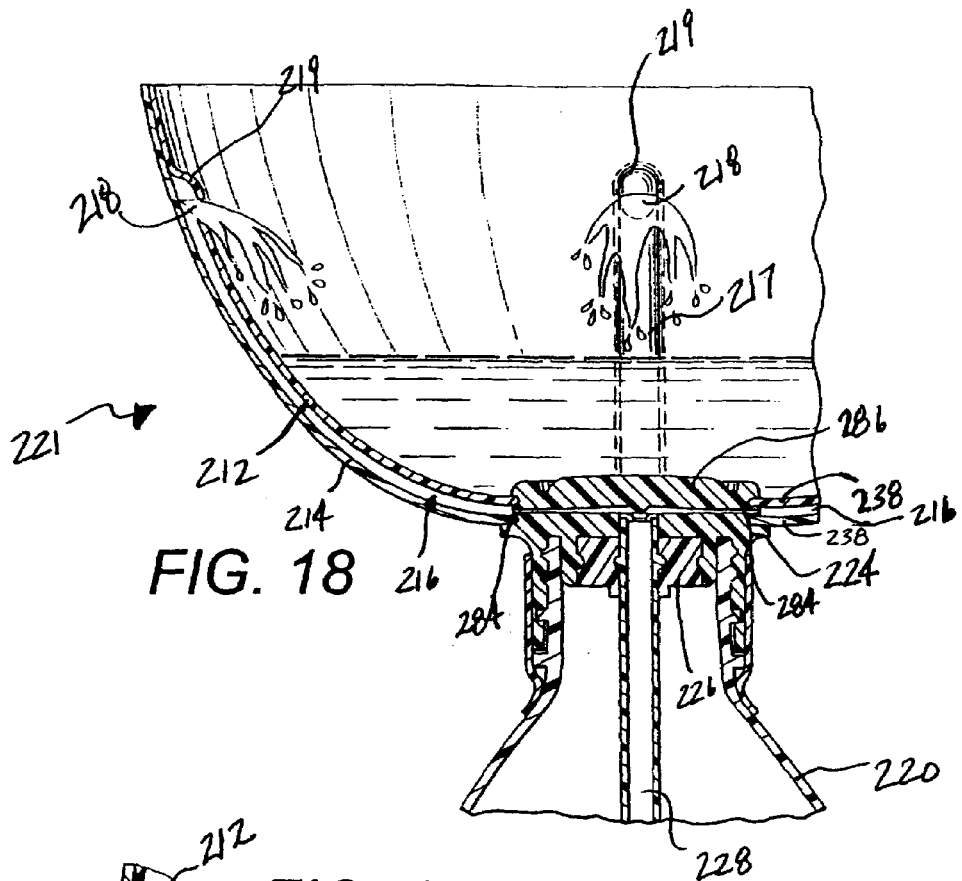
FIG. 18 is a partial cross-section of the drink container of FIG. 16, showing a cap passageway and a bowl passageway that allow for liquid to move from the vessel through the cap and into the inner bowl.
Figure 19:
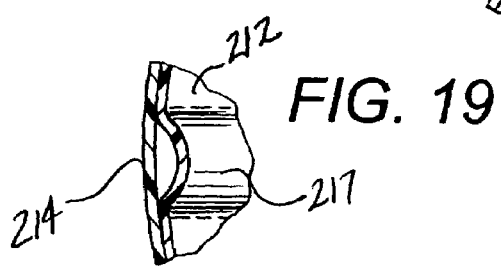
FIG. 19 is a detail view of a bowl passageway of the drink container of FIG. 16.
Figure 20:
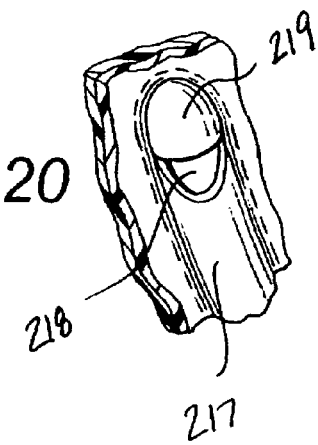
FIG. 20 is a detail view of an outlet of the bowl passageway of the drink container of FIG. 16; and, FIG. 21 is a top view of the drink container of FIG. 16, showing the raised contour of the bowl passageways of the inner bowl.
Figure 21:
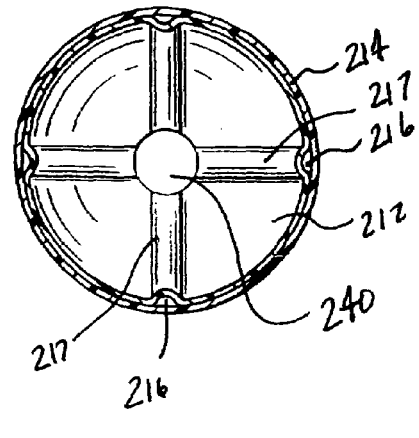

The drink bowl assembly 221 is formed from an inner bowl 212 joined to an outer bowl 214. As shown in FIG. 18, the inner and outer bowls 212, 214 are sealed at their upper portions, for example by molding or heat sealing, and are spaced a distance apart at their intermediate and lower portions to define at least one bowl passageway 216 there between. Each of the inner and outer bowls 212, 214 has a bottom wall 238 with a central opening 240 defined by an internal edge 242. At an upper portion, the inner bowl 212 has at least one outlet 218 that is fluid communication with the bowl passageway 216 such that fluid can exit the passageway 216 via the outlet 218. Unlike the bowl passageway 116 of the second container 110, the present bowl passageway 216 is not continuous along the side walls of the inner and outer bowls 212, 214. Instead, the bowl passageway 216 extends upward from the cap 224 to an outlet 218. A bottom edge of the bowl passageway 216 is in fluid communication with a cap passageway 284, and an upper edge of the bowl passageway 216 is fluid communication with an outlet 218. The cap passageway 284 is consistent with that explained in the previous embodiment of the cap 124. The bowl passageway 216 includes an inwardly directed segment 217 that forms a rib on the inner surface of the inner bowl 212. Preferably, the container 210 includes four distinct bowl passageways 216 and four distinct cap passageways 284, wherein a single bowl passageway 216 is in fluid communication with a single cap passageway 284. As shown in FIG. 21, the four bowl passageways extend outward from the central aperture 240 and are spaced approximately 90 degrees apart. To ensure that the fluid will exit through the outlets 218 and accumulate in the inner drink bowl 212, each outlet 218 has a hood 219 that extends inward from an inner surface of the bowl 212.

While the specific embodiments have been illustrated and described, numerous modifications come to mind without significantly departing from the spirit of the invention, and the scope of protection is only limited by the scope of the accompanying Claims.

What is claimed is:

1. A portable drink container for pets comprising: a fluid vessel having an upwardly extending neck with external threads and defining an outlet opening; a drink bowl assembly having an inner bowl and an outer bowl wherein a bowl passageway is formed between the inner and outer bowls, wherein each of the inner and outer bowls have a bottom wall with a central opening defined by an internal edge, and wherein the inner bowl has an outlet aligned with the bowl passageway; a cap having a central aperture and a cavity that engages the external threads of the neck, the cap further having a lower channel that slidingly receives the internal edge of the bottom wall of the outer bowl, wherein the cap has at least one cap passageway extending radially outward from the central aperture, and wherein an upper portion of the cap has a piercing element; and, a flexible conduit positioned within the fluid vessel and extending through the aperture of the cap, wherein an upper portion of the conduit has a frangible seal that is ruptured by the piercing element when a downwardly directed force is applied to the upper cap portion, and wherein the rupture of the seal defines a passageway for fluid to travel from the vessel through both the cap passageway and the bowl passageway into the inner drink bowl.

2. The portable drink container of claim 1, further comprising an elastomeric plug having an orifice, the elastomeric plug being secured within the cap such that the orifice is aligned with the aperture of the cap to receive a portion of the conduit.

3. The portable drink container of claim 1, wherein the inner bowl has a circumference and the outer bowl has a greater circumference than that of the inner bowl whereby the bowl passageway results from the difference in the circumferences, and wherein the fluid exits the cap passageway and travels through the bowl passageway and exits through the inner outlet into the inner bowl.

4. The portable drink container of claim 1, wherein upper regions of the inner and outer bowls are sealed to terminate the bowl passageway.

5. The portable drink container of claim 1, further comprising a removable support base with a receiver dimensioned to receive a lower portion of the fluid vessel, the removable support base having a smaller circumference than the inner bowl such that the removable support base can be stored within the inner bowl.

6. A portable drink container for pets comprising: a fluid vessel having an upwardly extending neck with external threads and defining an outlet opening; a drink bowl assembly having an inner bowl and an outer bowl wherein a plurality of bowl passageways are formed between the inner and outer bowls, wherein each of the inner and outer bowls have a bottom wall with a central opening defined by an internal edge, and wherein the inner bowl has an outlet aligned with each bowl passageway; a cap having a central aperture and a cavity that engages the external threads of the neck, the cap further having a lower peripheral channel that slidingly receives the bottom wall internal edge of the outer bowl, wherein the cap has a plurality of cap passageways, each passageway extending radially outward from the central aperture and being aligned with a single bowl passageway, and wherein an upper portion of the cap has a piercing element; and, a flexible conduit positioned within the fluid vessel and extending through the aperture of the cap, wherein an upper edge of the conduit has a frangible seal that is ruptured by the application of a downwardly directed force upon the upper cap portion that drives the piercing element through the seal, and wherein the rupture of the seal defines a passageway for fluid to travel from the vessel through the cap passageways, the bowl passageways and the outlets into the inner drink bowl.

7. The portable drink container of claim 6, further comprising an elastomeric plug having an orifice, the elastomeric plug being secured to the cap and radially inward of the cavity such that the orifice is aligned with the aperture of the cap and receives a portion of the conduit.

8. The portable drink container of claim 6, wherein upper regions of the inner and outer bowls are sealed to terminate the bowl passageways.

9. The portable drink container of claim 8, wherein the bowl passageways and the cap passageways are angularly positioned approximately 90 degrees apart.

10. The portable drink container of claim 6, wherein the cap includes four cap passageways and the bowl assembly includes four bowl passageways, and wherein a single cap passageway is aligned with a single bowl passageway.

11. The portable drink container of claim 6, wherein each outlet has a hood that extends inward from a side wall of the inner bowl.

12. The portable drink container of claim 6, wherein an upper portion of the cap has a channel that slidingly receives the bottom wall internal edge of the inner bowl.

* * * * *